US006265339B1

(12) United States Patent
Bidell et al.

(10) Patent No.: US 6,265,339 B1
(45) Date of Patent: Jul. 24, 2001

(54) PROCESS FOR PREPARING CARRIER-BORNE TRANSITION METAL CATALYSTS

(75) Inventors: Wolfgang Bidell, Mutterstadt; Franz Langhauser, Ruppertsberg; Ulrich Moll, St Martin, all of (DE); Ian David McKenzie, Welwyn Garden City (GB); David Fischer, Gönnheim (DE); Roland Hingmann, Ladenburg (DE); Günther Schweier, Friedelsheim (DE); Bernd Lothar Marczinke, Speyer (DE); Meinolf Kersting, Neustadt (DE); Peter John Vaughan Jones, Billingham (DE); John Russell Grasmeder, Dirmstein (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/202,534

(22) PCT Filed: Jun. 17, 1997

(86) PCT No.: PCT/EP97/03132

§ 371 Date: Dec. 16, 1998

§ 102(e) Date: Dec. 16, 1998

(87) PCT Pub. No.: WO98/01481

PCT Pub. Date: Jan. 15, 1998

(30) Foreign Application Priority Data

Jul. 4, 1996 (DE) .............................. 196 26 834
May 20, 1997 (DE) ............................ 197 20 979

(51) Int. Cl.[7] ................ C08F 4/16; B01J 31/38
(52) U.S. Cl. ................ 502/104; 502/117; 502/152; 526/160; 526/943; 526/348.6
(58) Field of Search .................... 502/104, 103, 502/108, 117, 118, 152; 526/154, 160, 348, 943, 348.6

(56) References Cited

U.S. PATENT DOCUMENTS 4,794,096  12/1988  Ewen .
4,921,825 * 5/1990 Kioka et al. ................ 502/104
5,057,475 * 10/1991 Canich et al. ............... 502/104
5,371,260  12/1994  Sangokoya .
5,391,793   2/1995  Marks et al. .
5,470,993  11/1995  Devore et al. .
5,965,677 * 10/1999  Stephan et al. ............. 526/129
5,968,864 * 10/1999  Shamshoum et al. ........ 502/104

FOREIGN PATENT DOCUMENTS 2150890     12/1995  (CA) .
196 16523   11/1997  (DE) .
196 23225   12/1997  (DE) .
284 708     10/1988  (EP) .
295 312     12/1988  (EP) .
633 264      1/1995  (EP) .
91/09882     7/1991  (WO) .
94/07928     4/1994  (WO) .
94/28034    12/1994  (WO) .
95/33776    12/1995  (WO) .

OTHER PUBLICATIONS

J. Org. Chem. 369(1989)359–370, Wiesenfeld et al.
J. Org. Chem. 500(1995)203–217, Lappert et al.

* cited by examiner

*Primary Examiner*—David W. Wu
*Assistant Examiner*—R. Harlan
(74) *Attorney, Agent, or Firm*—Keil & Weinkauf

(57) ABSTRACT

A process for preparing a supported transition metal catalyst comprising a particulate organic or inorganic support material, a transition metal complex and a compound capable of forming metallocenium ions comprises the following process steps:

a) contacting a solution of a compound capable of forming metallocenium ions with a second solvent in which this compound is only sparingly soluble, in the presence of the support material, b) removing at least part of the solvent from the support material and c) contacting a solution of a mixture of a compound capable of forming metallocenium ions and a transition metal complex with a second solvent in which this mixture is only sparingly soluble, in the presence of the support material obtained as described in a) and b).

9 Claims, No Drawings

PROCESS FOR PREPARING CARRIER-BORNE TRANSITION METAL CATALYSTS

The present invention relates to a process for preparing a supported transition metal catalyst comprising a particulate organic or inorganic support material, a transition metal complex and a compound capable of forming metallocenium ions.

The present invention also relates to a supported catalyst obtainable by this process, a process for preparing polymers by means of this catalyst and the use of these polymers for producing fibers, films and moldings.

Supported transition metal catalysts have been known for a long time and are, for example, used for olefin polymerization. The activity and productivity of these catalysts depends significantly on their process of preparation. The selection of the loading parameters generally attempts to achieve a sufficiently strong binding of the catalyst and possibly the cocatalysts to the support and also as homogeneous as possible a distribution of the active components on the support.

WO 94/28034 describes the preparation of a supported catalyst for olefin polymerization, where a metallocene complex together with an aluminoxane or methylaluminoxane in a liquid hydrocarbon is brought into contact with an inert support, typically silica gel, and the solvent is subsequently removed by distillation.

EP-A1-295 312 describes various processes for preparing supported olefin polymerization catalysts. A feature common to these processes is that a solution of an aluminoxane is brought into contact with a second solvent in which the aluminoxane is insoluble in the presence of a particulate organic or inorganic support, resulting in precipitation of the aluminoxane onto the support. In the various embodiments, first the aluminoxane and then a metallocene complex are precipitated stepwise onto the support or else a mixture of aluminoxane and metallocene complex is precipitated simultaneously.

However, the preparative methods described lead to supported catalysts which still leave something to be desired in terms of their activity and productivity.

It is an object of the present invention to find a process for preparing supported transition metal catalysts which leads to catalysts of higher productivity.

We have found that this object is achieved by a process for preparing a supported transition metal catalyst comprising a particulate organic or inorganic support material, a transition metal complex and a compound capable of forming metallocenium ions, which comprises the following process steps:

a) contacting a solution of a compound capable of forming metallocenium ions with a second solvent in which this compound is only sparingly soluble, in the presence of the support material, b) removing at least part of the solvent from the support material and c) contacting a solution of a mixture of a compound capable of forming metallocenium ions and a transition metal complex with a second solvent in which this mixture is only sparingly soluble, in the presence of the support material obtained as described in a) and b).

Furthermore, we have found a supported catalyst obtainable by this process, a process for preparing polymers by means of this catalyst and the use of these polymers for producing fibers, films and moldings.

Examples of suitable particulate organic or inorganic support material are polyolefins such as polyethylene, polypropylene, poly-1-butene and polymethyl-1-pentene and copolymers with the monomers on which these polymers are based, also polyesters, polyamides, polyvinyl chloride, polyacrylates and polymethacrylates and polystyrene. However, preference is given to inorganic support materials such as porous oxides, eg. $SiO_2$, $Al_2O_3$, MgO, $ZrO_2$, $TiO_2$, $B_2O_3$, CaO, ZnO. Metal halides such as $MgCl_2$ are also suitable as supports. The support materials preferably have a particle diameter of from 1 to 300 $\mu$m, in particular from 30 to 70 $\mu$m. Examples of particularly preferred supports are silica gels, preferably those of the formula $SiO_2 \cdot a\, Al_2O_3$, where a is a number in the range from 0 to 2, preferably from 0 to 0.5; these are thus aluminosilicates or silicon dioxide. Such products are commercially available, eg. Silica Gel 332 from Grace.

Particularly suitable silica gels are those which have voids and channels whose macroscopic proportion by volume in the total particle is in the range from 5 to 30%. Preference is given to those silica gel supports which have a mean particle diameter of from 5 to 200 $\mu$m and a mean particle diameter of the primary particles of from 1 to 20 $\mu$m, in particular from 1 to 10 $\mu$m. The primary articles [sic] here are porous, granular particles. The primary particles have pores having a diameter of, in particular, from 1 to 1000 Ångström. Furthermore, the inorganic oxides to be used additionally have voids and channels having a diameter of from 1 to 20 $\mu$m. These silica gels also have, in particular, a pore volume of from 0.1 to 10 $cm^3/g$, preferably from 1.0 to 5.0 $cm^3/g$, and a specific surface area of from 10 to 1000 $m^2/g$. Such products are commercially available, e.g. Sylopol 2101 (from Grace), ES 70X (from Crosfield) or MS 3040 (from PQ Corporation). Further characteristics of such silica gels are described in the previous German Patent Application 19 623 225.2, whose contents are incorporated by reference into the present document.

Examples of suitable transition metal complexes are metal complexes containing metallocene ligands or other organic ligands such as β-diketiminate or azaallyl ligands, as are described, for example, in J. Organomet. Chem. 500 (1995), 203–217, in WO 95/33776 and also in the previous German Patent Application 19 616 523.7. Particularly suitable transition metal complexes for use in the process of the present invention are metallocene complexes of elements of the 4th and 5th transition groups of the Periodic Table. Particularly suitable transition metal complexes are, furthermore, those containing benzindenyl ligands. These benzindenyl ligands can be substituted or unsubstituted.

Suitable metallocene complexes are in particular those of the general formula III

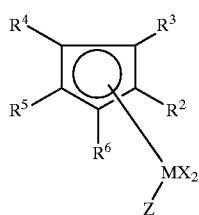

where the substituents have the following meanings:

M is titanium, zirconium, hafnium, vanadium, niobium or tantalum,

X is fluorine, chlorine, bromine, iodine, hydrogen, $C_1$–$C_{10}$-alkyl, $C_6$–$C_{15}$-aryl, alkylaryl having from 1 to 10 carbon atoms in the alkyl radical and from 6 to 20 carbon atoms in the aryl radical, $-OR^7$ or $-NR^7R^8$, where R[7] and R[8] are $C_1$–$C_{10}$-alkyl, $C_6$–$C_{15}$-aryl, alkylaryl, arylalkyl, fluoroalkyl or fluoroaryl each having from 1 to 10 carbon atoms in the alkyl radical and from 6 to 20 carbon atoms in the aryl radical, R[2] to R[6] are hydrogen, $C_1$–$C_{10}$-alkyl, 5- to 7-membered cycloalkyl which may in turn bear a $C_1$–$C_{10}$-alkyl group as substituent, $C_6$–$C_{15}$-aryl or arylalkyl, where two adjacent radicals may also together form a saturated or unsaturated cyclic group having from 4 to 15 carbon atoms, or $Si(R^9)_3$ where R[9] is $C_1$–$C_{10}$-alkyl, $C_3$–$C_{10}$-cycloalkyl or $C_6$–$C_{15}$-aryl, Z is X or 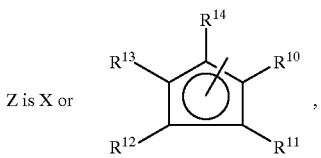, where the radicals R[10] to R[14] are hydrogen, $C_1$–$C_{10}$-alkyl, 5- to 7-membered cycloalkyl which may in turn bear a $C_1$–$C_{10}$-alkyl group as substituent, $C_6$–$C_{15}$-aryl or arylalkyl and where two adjacent radicals may also together form a saturated or unsaturated cyclic group having from 4 to 15 carbon atoms, or $Si(R^{15})_3$ where R[15] is $C_1$–$C_{10}$-alkyl, $C_6$–$C_{15}$-aryl or $C_3$–$C_{10}$-cycloalkyl, or where the radicals R[5] and Z together form a group —R[16]—A—, where

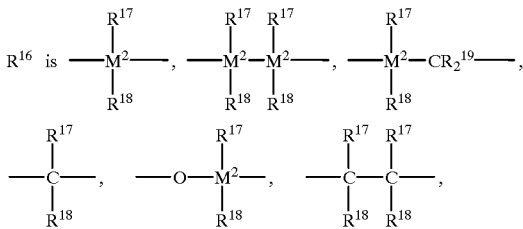

=BR[17], =AlR[17], —Ge—, —Sn—, —O—, —S—, =SO, =SO$_2$, =NR[17], =CO, =PR[17] or =P(O)R[17],
where R[17], R[18] and R[19] are identical or different and are hydrogen, halogen, $C_1$–$C_{10}$-alkyl, $C_1$–$C_{10}$-fluoroalkyl, $C_6$–$C_{10}$-fluoroaryl, $C_6$–$C_{10}$-aryl, $C_1$–$C_{10}$-alkoxy, $C_2$–$C_{10}$-alkenyl, $C_7$–$C_{40}$-arylalkyl, $C_8$–$C_{40}$-arylalkenyl or $C_7$–$C_{40}$-alkylaryl or two adjacent radicals together with the atoms connecting them form a ring, and M[2] is silicon, germanium or tin, A is 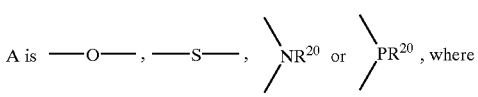, where R[20] is $C_1$–$C_{10}$-alkyl, $C_6$–$C_{15}$-aryl, $C_3$–$C_{10}$-cycloalkyl, alkylaryl or $Si(R^{21})_3$, R[21] is hydrogen, $C_1$–$C_{10}$-alkyl, $C_6$–$C_{15}$-aryl which may in turn be substituted by $C_1$–$C_4$-alkyl groups, or $C_3$–$C_{10}$-cycloalkyl or where the radicals R[5] and R[13] together form a group —R[16]—.

Among the metallocene complexes of the general formula III, preference is given to

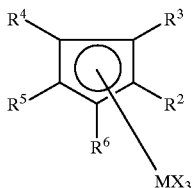

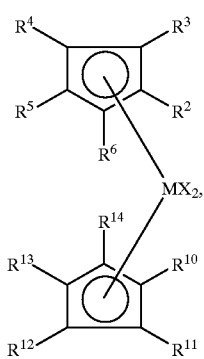

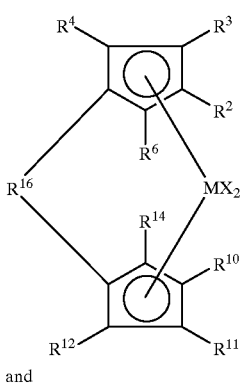

and

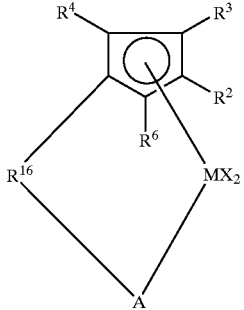

Particular preference is given to those transition metal complexes which contain two aromatic ring systems bridged to one another as ligands, ie. in particular the transition metal complexes of the general formulae IIIb and IIIc.

The radicals X can be identical or different, preferably identical.

Among the compounds of the formula IIIa, particular preference is given to those in which M is titanium, zirconium or hafnium, X is chlorine, $C_1$–$C_4$-alkyl or phenyl and R[2] to R[6] is hydrogen or $C_1$–$C_4$-alkyl.

Among the compounds of the formula IIIb, preference is given to those in which

M is titanium, zirconium or hafnium,
X is chlorine, $C_1$–$C_4$-alkyl or phenyl,
$R^2$ to $R^6$ are hydrogen, $C_1$–$C_4$-alkyl or $Si(R^9)_3$,
$R^{10}$ to $R^{14}$ are hydrogen, $C_1$–$C_4$-alkyl or $Si(R^{15})_3$.

Particularly suitable are the compounds of the formula IIIb in which the cyclopentadienyl radicals are identical.

Examples of particularly suitable compounds are:
bis(cyclopentadienyl)zirconium dichloride,
bis(pentamethylcyclopentadienyl)zirconium dichloride,
bis(methylcyclopentadienyl)zirconium dichloride,
bis(ethylcyclopentadienyl)zirconium dichloride,
bis(n-butylcyclopentadienyl)zirconium dichloride and
bis(trimethylsilylcyclopentadienyl)zirconium dichloride
and also the corresponding dimethylzirconium compounds.

Particularly suitable compounds of the formula IIIc are those in which
$R^2$ and $R^{10}$ are identical and are hydrogen or $C_1$–$C_{10}$-alkyl,
$R^6$ and $R^{14}$ are identical and are hydrogen, methyl, ethyl, iso-propyl or tert-butyl,
$R^3$, $R^4$, $R^{11}$ and $R^{12}$ have the meanings
$R^4$ and $R^{12}$ are $C_1$–$C_4$-alkyl,
$R^3$ and $R^{11}$ are hydrogen or two adjacent radicals $R^3$ and $R^4$ or $R^{11}$ and $R^{12}$ together form cyclic groups having from 4 to 12 carbon atoms,

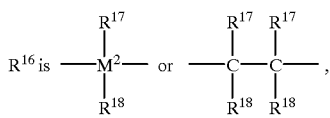

M is titanium, zirconium or hafnium and
X chlorine, $C_1$–$C_4$-alkyl or phenyl.

Examples of particularly suitable complexes are:
dimethylsilanediylbis(cyclopentadienyl)zirconium dichloride,
dimethylsilanediylbis(indenyl)zirconium dichloride,
dimethylsilanediylbis(tetrahydroindenyl)zirconium dichloride,
ethylenebis(cyclopentadienyl)zirconium dichloride,
ethylenebis(indenyl)zirconium dichloride,
ethylenebis(tetrahydroindenyl)zirconium dichloride,
tetramethylethylene-9-fluorenylcyclopentadienylzirconium dichloride,
dimethylsilanediylbis(3-tert-butyl-5-methylcyclopentadienyl) zirconium dichloride,
dimethylsilanediylbis(3-tert-butyl-5-ethylcyclopentadienyl) zirconium dichloride,
dimethylsilanediylbis(2-methylindenyl)zirconium dichloride,
dimethylsilanediylbis(2-isopropylindenyl)zirconium dichloride,
dimethylsilanediylbis(2-tert-butylindenyl)zirconium dichloride,
diethylsilanediylbis(2-methylindenyl)zirconium dibromide,
dimethylsilanediylbis(3-methyl-5-methylcyclopentadienyl) zirconium dichloride,
dimethylsilanediylbis(3-ethyl-5-isopropylcyclopentadienyl)zirconium dichloride,
dimethylsilanediylbis(2-methylindenyl)zirconium dichloride,
dimethylsilanediylbis(2-methylbenzindenyl)zirconium dichloride
dimethylsilanediylbis(2-ethylbenzindenyl)zirconium dichloride,
methylphenylsilanediylbis(2-ethylbenzindenyl)zirconium dichloride,
methylphenylsilanediylbis(2-methylbenzindenyl)zirconium dichloride,
diphenylsilanediylbis(2-methylbenzindenyl)zirconium dichloride,
diphenylsilanediylbis(2-ethylbenzindenyl)zirconium dichloride, and dmethylsilanediylbis(2-methylindenyl) hafnium dichloride and also the corresponding dimethylzirconium compounds.

Particularly suitable compounds of the general formula IIId are those in which
M is titanium or zirconium,
X if chlorine, $C_1$–$C_4$-alkyl or phenyl,

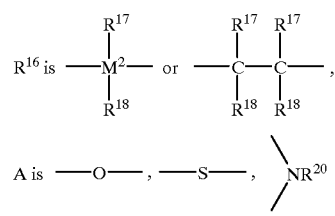

and
$R^2$ to $R^4$ and $R^6$ are hydrogen, $C_1$–$C_{10}$-alkyl, $C_3$–$C_{10}$-cycloalkyl,
$C_6$–$C_{15}$-aryl or $Si(R^9)_3$, or two adjacent radicals form a cyclic group having from 4 to 12 carbon atoms.

Such complexes can be synthesized by methods known per se, with the reaction of the corresponding substituted, cyclic hydrocarbon anions with halides of titanium, zirconium, hafnium, vanadium, niobium or tantalum being preferred.

Examples of corresponding preparative methods are described in, inter alia, Journal of Organometallic Chemistry, 369 (1989), 359–370.

It is also possible to use mixtures of different metallocene complexes.

As a further component, the catalyst prepared by the process of the present invention comprises a compound capable of forming metallocenium ions.

Suitable compounds capable of forming metallocenium ions are strong, uncharged Lewis acids, ionic compounds having Lewis-acid cations and ionic compounds having a Brönsted acid as cation.

As strong, uncharged Lewis acids, preference is given to compounds of the general formula IV $$M^3X^1X^2X^3 \qquad \text{IV}$$

where
$M^3$ is an element of main group III of the Periodic Table, in particular B, Al or Ga, preferably B,
$X^1$, $X^2$ and $X^3$ are hydrogen, $C_1$–$C_{10}$-alkyl, $C_6$–$C_{15}$-aryl, alkylaryl, arylalkyl, haloalkyl or haloaryl each having from 1 to 10 carbon atoms in the alkyl radical and from 6 to 20 carbon atoms in the aryl radical or fluorine, chlorine, bromine or iodine, in particular haloaryls, preferably pentafluorophenyl.

Particular preference is given to compounds of the general formula IV, in which $X^1$, $X^2$ and $X^3$ are identical, preferably tris(pentafluorophenyl)borane.

Suitable ionic compounds having Lewis-acid cations are compounds ontaining cations of the general formula V $$[(Y^{a+})Q_1Q_2 \ldots Q_z]^{d+} \qquad V,$$

where
- Y is an element of main groups I to VI or transition groups I to VIII of the Periodic Table,
- $Q_1$ to $Q_z$ are singly negatively charged groups such as $C_1$–$C_{28}$-alkyl, $C_6$–$C_{15}$-aryl, alkylaryl, arylalkyl, haloalkyl, haloaryl each having from 6 to 20 carbon atoms in the aryl radical and from 1 to 28 carbon atoms in the alkyl radical, $C_1$–$C_{10}$-cycloalkyl which may be substituted by $C_1$–$C_{10}$-alkyl groups, halogen, $C_1$–$C_{28}$-alkoxy, $C_6$–$C_{15}$-aryloxy, silyl or mercaptyl,
- a is an integer from 1 to 6,
- z is an integer from 0 to 5
- d is the difference a-z but is greater than or equal to 1.

Particularly suitable cations are carbonium cations, oxonium cations and sulfonium cations and also cationic transition metal complexes. Particular mention may be made of the triphenylmethyl cation, the silver cation and the 1,1'-dimethylferrocenyl cation. They preferably have non-coordinating counterions, in particular boron compounds as are also mentioned in WO 91/09882, preferably tetrakis (pentafluorophenyl)borate.

Ionic compounds having Bronsted acids as cations and preferably likewise non-coordinating counterions are mentioned in WO 91/09882, the preferred cation being N,N-dimethylanilinium.

Particularly suitable compounds capable of forming metallocenium ions are open-chain or cyclic aluminoxane compounds of the general formula I or II

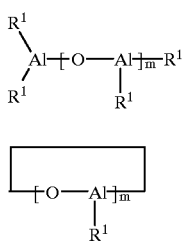

where $R^1$ is $C_1$–$C_4$-alkyl, preferably methyl or ethyl, and m is an integer from 5 to 30, preferably from 10 to 25.

The preparation of these oligomeric aluminoxane compounds is customarily carried out by reacting a solution of trialkylaluminum with water and is described, for example, in EP-A 284 708 and U.S. Pat. No. 4,794,096.

The resulting oligomeric aluminoxane compounds are generally in the form of mixtures of linear and cyclic chain molecules of different lengths, so that m is to be regarded as a mean. The aluminoxane compounds can also be present in admixture with other metal alkyls, preferably with aluminum alkyls.

As compounds capable of forming metallocenium ions, it is also possible to use aryloxyaluminoxanes as described in U.S. Pat. No. 5,391,793, aminoaluminoxanes, as described in U.S. Pat. No. 5,371,260, aminoaluminoxane hydrochlorides, as described in EP-A 633 264, siloxyaluminoxanes, as described in EP-A 621 279, or mixtures thereof.

The first process step a) for the preparation according to the present invention of the supported transition metal catalysts comprises contacting a solution of a compound capable of forming metallocenium ions with a second solvent in which this compound is only sparingly soluble, in the presence of the support material. For this purpose, the compound capable of forming metallocenium ions is first dissolved in a first solvent in which it is readily soluble. Suitable solvents for many compounds capable of forming metallocenium ions, particularly for the aluminoxane compounds of the formulae I and II, are, for example, aromatic solvents such as benzene, toluene, ethylbenzene, xylene or chlorobenzene and also chlorinated hydrocarbons such as dichloroethane or methylene chloride.

As second solvent in which the compound capable of forming metallocenium ions is only sparingly soluble, suitable solvents are especially linear or branched aliphatic hydrocarbons such as pentane, hexane, heptane, octane, decane, dodecane, in particular isododecane. It is also possible to use industrial mixtures of various hydrocarbons of this type, eg. kerosine and the isododecane mentioned. Also suitable as second solvent are cycloaliphatic solvents such as cyclohexane and norbornane. In this context, sparingly soluble means that out of the given concentrations of the compound capable of forming metallocenium ions the major part of this compound can be precipitated by the solvent.

The contacting can be carried out in various ways. For example, the solution of the compound capable of forming metallocenium ions can be initially charged and admixed with a suspension of the support material in the second solvent or vice versa. It is also possible to initially charge a suspension of the support material in the first solvent or in a solution of the compound capable of forming metallocenium ions and admix this with the second solvent. A particularly useful variant is to suspend the support material in the second solvent and to slowly add the solution of the compound capable of forming metallocenium ions to this suspension; the suspension should be stirred continuously during this procedure.

For process step a), it is advantageous to adhere to the following weight ratios:

The ratio of compound capable of forming metallocenium ions to the support material should be as high as possible in order to achieve as high as possible a loading of the support. It is preferably from 1:1 to 0.05:1, particularly preferably from 0.8:1 to 0.3:1.

The ratio of compound capable of forming metallocenium ions to the first solvent should where possible be as great as the solubility permits, thus generally from 0.5:1 to 0.01:1, particularly preferably from 0.3:1 to 0.1:1.

The ratio of the first solvent to the second solvent should be as low as possible in order to achieve as effective as possible a precipitation of the compound capable of forming metallocenium ions onto the support. Preference is given to a weight ratio of from 1:1 to 0.05:1, particularly preferably from 0.5:1 to 0.1:1.

In the subsequent process step b), at least part of the solvent is removed from the support material modified as described in a). This can be carried out, for example, by distillation, preferably by fractional distillation. When solvent is removed by distillation, it is advisable to select the solvent pair such that the first solvent has a lower boiling point, preferably a boiling point more than 20° C. lower, than the second solvent. In this way, the major part of the first solvent can be removed from the suspension, thus achieving a more effective precipitation of the catalyst component in step c).

A mechanical separation of the suspension, for example by filtration, has been found to be even more useful than the removal of the solvent by distillation. In this way, nonvolatile unbound constituents of the solution of the compound capable of forming metallocenium ions can also be removed from the support material. An embodiment of the process of the present invention in which the support material is filtered off and then washed first with the first solvent or another solvent in which the compound capable of forming metallocenium ions is readily soluble and subsequently with the second solvent has been found to be particularly advantageous since catalysts of particularly high productivity can be prepared in this way.

This washing step is preferably carried out using from 5 to 40 parts by volume of the respective solvent, particularly preferably from 10 to 20 parts by volume, in each case based on the volume of the support material. Repeated washing with the corresponding solvents has also been found to be advantageous.

The step c) of the process of the present invention comprises loading the support with the actual catalyst complex. Suitable ways of carrying out step c) are the same as those mentioned for step a). Here too, it has been found to be advantageous to initially charge a suspension of the support material in the second solvent and to slowly add the solution of a mixture of the compound capable of forming metallocenium ions and the transition metal complex in the first solvent to this suspension, preferably whilst stirring continually.

After the addition of the solution of the mixture of the compound capable of forming metallocenium ions and the transition metal complex, it can be advantageous to achieve complete precipitation by distillative removal of the first solvent which in this case has to have a lower boiling point than the second solvent. This procedure is particularly advantageous when a large amount of the first solvent has had to be used for solubility reasons.

The mixture of compound capable of forming metallocenium ions and transition metal complex preferably contains these two components in a weight ratio of from 40:1 to 3:1, particularly preferably from 20:1 to 5:1.

The solution of the mixture should be as concentrated as possible. This solution preferably contains from 5 to 50% by weight of the mixture, particularly preferably from 20 to 30% by weight.

For the other proportions by volume and weight, the ratios specified for process step a) apply.

The process temperature for the loading steps depends, inter alia, on the stability of the compound capable of forming metallocenium ions and of the transition metal complex. The temperature of the suspension of the support should preferably be low while the temperature of the solution of the active components in process steps a) and c) should be higher, although a uniform process temperature also leads to good results. The process temperature is generally from −10 to +60° C., preferably from +10 to +40° C., particularly preferably from 20 to 30° C.

The pressure has virtually no influence on the process result, although a reduced pressure can be advantageous in the distillation in process step c).

The multistage process of the present invention for preparing a supported transition metal catalyst leads to catalysts having very homogeneously distributed active components and high loadings. These advantages result from the combination of the process steps a), b) and c). In step a), a high loading of the support with the compound capable of forming metallocenium ions is achieved. Step b) removes constituents which interfere in the subsequent step c). By means of the prereaction of the transition metal complex with the compound capable of forming metallocenium ions, step c) effects the formation of an active catalyst complex and an increase in the solubility of the transition metal complex, thus making possible a higher and more homogeneous loading of the support. The increase in the solubility is particularly useful in the case of sparingly soluble complexes such as the transition metal complexes having two aromatic ring systems bridged to one another. However, without the pretreatment of the support in accordance with process step a), process step c) leads to unsatisfactory results.

According to the present invention, the supported transition metal catalyst described here is particularly suitable for processes for preparing polymers of $C_2$–$C_{12}$-alk-1-enes at from −50 to 300° C. and pressures of from 0.5 to 3000 bar.

Among the $C_2$–$C_{12}$-alk-1-enes used in the process of the present invention for preparing polymers, preference is given to ethylene, propene, 1-butene, 1-pentene, 4-methylpent-1-ene, 1-hexene, 1-heptene or 1-octene, and also mixtures of these. Particular preference is given to homopolymers or copolymers of propene, with the propene in the copolymers being at least 50 mol %. Preferred copolymers of propene are those containing ethylene or 1-butene or a mixture thereof as further monomers.

The process of the present invention for preparing polymers is carried out at from −50 to 300° C., preferably from 0 to 150° C. and at pressures in the range from 0.5 to 3000 bar, preferably in the range from 1 to 80 bar.

The polymerization can be carried out in solution, in suspension, in liquid monomers or in the gas phase. The polymerization is preferably carried out in liquid monomers or in the gas phase, with the stirred gas phase being preferred.

The process can be carried out continuously or batchwise. Suitable reactors are, inter alia, continuous stirred vessels, with it also being possible to use, if desired, a series of stirred vessels connected in series (reactor cascade).

The polymerization process of the present invention can be carried out readily on an industrial scale and gives good polymer morphology, uniform polymer chain lengths, no deposit formation, no agglomerate formation and good productivity.

A preferred embodiment of the polymerization process of the present invention comprises polymerization in the presence of hydrogen as molecular weight regulator. The catalyst system of the present invention responds to even small amounts of hydrogen to give a pronounced productivity increase. The proportion of hydrogen, eg. in a gas-phase polymerization, is preferably from 0.01 to 1.2% by volume, particularly preferably from 0.05 to 0.9% by volume, based on the total volume of the polymerization gas mixture.

The polymers obtained by the polymerization process of the present invention are well suited, for example, to the production of fibers, films and moldings.

EXAMPLES

Example 1

1.1 Preparation of the catalyst 20 g of silica gel SG 332 (manufactured by Grace, Worms) were partially dehydrated under reduced pressure at 180° C. for 8 hours, suspended in 170 ml of pentane and subsequently 160 ml of 1.53M methylaluminoxane (MAO) in toluene (manufactured by Witco, Bergkamen) were added dropwise over a period of 4 hours. After 12 hours at 25° C., the supernatant colorless solution was decanted off and the MAO-laden support was washed with 2×50 ml of toluene and subsequently with 2×50 ml of pentane. The MAO-laden silica gel was resuspended in 150 ml of pentane and admixed over a period of 4 hours with a solution of 115 mg of rac-bis[3,3'-(2-methyl-benzo[e]indenyl)]dimethylsilanediylzirconium dichloride in 30.6 ml of 1.53M MAO (toluene solution). After 1 hour, the supported catalyst was isolated by filtration, washed with 2×50 ml of pentane and dried in a stream of $N_2$ at 25° C.

Yield: 29 g 1.2 Polymerization 50 g of polypropylene powder and 10 ml of triisobutylaluminum (2M in heptane) were placed one after the other in a dry 10 l autoclave which had been flushed with nitrogen and was stirred for 15 minutes. Subsequently, 510 mg of supported catalyst were introduced into the reactor in a countercurrent of nitrogen, the autoclave was closed and charged with 1.5 l of liquid propylene at 25° C. and a stirrer speed of 350 rpm. After prepolymerization for 30 minutes, the temperature was increased stepwise to 65° C., with the internal pressure being increased stepwise by means of automatic pressure regulation to the final pressure of 25 bar. Polymerization was then carried out in the gas phase at 65° C. for 60 minutes with automatic propylene gas pressure regulation (25 bar). After polymerization was complete, the autoclave was depressurized to atmospheric pressure over a period of 10 minutes and the resulting polymer was discharged in a stream of nitrogen. This gave 815 g of polypropylene powder, corresponding to a productivity of 1500 g of PP/g of catalyst/h. The associated catalyst and polymer data are listed in Tables 1 and 2.

Example 2

The preparation of the catalyst was carried out using a method similar to Example 1. The MAO loading of the partially dehydrated silica gel was carried out in the manner described above. For the metallocene loading, 288 mg of rac-bis[3,3'-(2-methylbenzo[e]-indenyl)]dimethylsilanediylzirconium dichloride in 65 ml of 1.53M MAO (toluene solution) were used. The yield was 30.1 g.

In the polymerization of propylene (carried out similarly to the polymerization of Example 1), 413 mg of supported catalyst gave 1065 g of polymer powder, corresponding to a productivity of 2450 g of PP/g of catalyst/h. The associated catalyst and polymer data are listed in Tables 1 and 2.

Example 3

The preparation of the catalyst was carried out using a method similar to Example 1. The MAO loading of the partially dehydrated silica gel was carried out in the manner described above. For the metallocene loading, 576 mg of rac-bis[3,3'-( 2-methylbenzo[e]-indenyl)]dimethylsilanediylzirconium dichloride in 130 ml of 1.53M MAO (toluene solution) were used. The yield was 32.4 g.

In the polymerization of propylene (carried out similarly to the polymerization of Example 1), 305 mg of supported catalyst gave 1180 g of polymer powder, corresponding to a productivity of 3700 g of PP/g of catalyst/h. The associated catalyst and polymer data are listed in Tables 1 and 2.

Example 4

The preparation of the catalyst was carried out using a method similar to Example 1. The MAO loading of the partially dehydrated silica gel was carried out in the manner described above. For the metallocene loading, 1152 mg of rac-bis[3,3'-(2-methylbenzo[e]-indenyl)]dimethylsilanediylzirconium dichloride in 260 ml of 1.53M MAO (toluene solution) were used. The yield was 32.9 g.

In the polymerization of propylene (carried out similarly to the polymerization of Example 1), 227 mg of supported catalyst gave 1180 g of polymer powder, corresponding to a productivity of 4950 g of PP/g of catalyst/h. The associated catalyst and polymer data are listed in Tables 1 and 2.

Example 5

The preparation of the catalyst was carried out using a method similar to Example 1. The MAO loading of the partially dehydrated silica gel was carried out in the manner described above. For the metallocene loading, 2304 mg of rac-bis[3,3'-(2-methylbenzo[e]-indenyl)]dimethylsilanediylzirconium dichloride in 520 ml of 1.53M MAO (toluene solution) were used. The yield was 33.4 g.

In the polymerization of propylene (carried out similarly to the polymerization of Example 1), 108 mg of supported catalyst gave 695 g of polymer powder, corresponding to a productivity of 4950 g of PP/g of catalyst/h. The associated catalyst and polymer data are listed in Tables 1 and 2.

Example 6

6.1 Preparation of the catalyst 20 g of silica gel SG 332 were partially dehydrated under reduced pressure at 180° C. for 8 hours, suspended in 200 ml of iso-dodecane and 160 ml of 1.53M MAO (toluene solution) was then slowly added dropwise at 0° C. over a period of 4 hours.

After 12 hours at 0° C., the supernatant colorless solution was filtered off and the MAO-laden support was washed with 2×50 ml of toluene and subsequently with 2×50 ml of pentane. Drying at 25° C. in a stream of $N_2$ gave 28.2 g of MAO-laden silica gel.

5.0 g of the MAO-laden silica gel thus prepared was suspended in 200 ml of iso-dodecane and admixed at 0° C. with a solution of 288 mg of bis[3,3'-(2-methylbenzo[e]indenyl)]dimethylsilanediylzirconium dichloride in 65 ml of 1.53M MAO (toluene solution) over a period of 4 hours. After 1 hour, the supported catalyst was isolated by filtration, washed with 2×25 ml of pentane and dried at 25° C. in a stream of $N_2$. The yield was 5.6 g.

6.2 Polymerization

The polymerization was carried out using a method similar to Example 1.2. In the polymerization of propylene, 198 mg of supported catalyst gave 1050 g of polymer powder, corresponding to a productivity of 5050 g of PP/g of catalyst/h. The associated polymer data are listed in Table 3.

7.1 Preparation of the catalyst 160 ml of 1.53M MAO (toluene solution) was reduced to 60 ml at 25° C. in a high vacuum (100 ml distilled off). The concentrated MAO/toluene solution was slowly added dropwise at 0° C. to a suspension of 20 g of silica gel SG 332 (partially dehydrated at 180° C. under reduced pressure for 8 hours) and 200 ml of iso-dodecane over a period of 4 hours. After 12 hours at 0° C., the supernatant colorless solution was filtered off and the MAO-laden support was washed with 2×50 ml of toluene and subsequently with 2×50 ml of pentane. Drying at 25° C. in a stream of $N_2$ gave 33.8 g of MAO-laden silica gel.

A solution of 288 mg of rac-bis[3,3'-(2-methylbenzo[e]-indenyl)]dimethylsilanediylzirconium dichloride in 65 ml of 1.53M MAO/toluene solution was reduced to a volume of 30 ml at 25° C. in a high vacuum. Subsequently, the concentrated MAO/metallocene solution was slowly added dropwise at 25° C. to a suspension of 5.0 g of the MAO-laden silica gel prepared above in 200 ml of iso-dodecane over a period of 4 hours. After 1 hour, the supported catalyst was isolated by filtration, washed with 2×25 ml of pentane and dried at 25° C. in a stream of $N_2$. The yield was 6.1 g.

7.2 Polymerization

The polymerization was carried out using a method similar to Example 1.2. In the polymerization of propylene, 142 mg of supported catalyst gave 860 g of polymer powder, corresponding to a productivity of 5700 g of PP/g of catalyst/h. The associated polymer data are listed in Table 3.

Example 8

5 g of silica gel SG 332 were partially dehydrated at 180° C. under reduced pressure for 8 hours, suspended in 50 ml of iso-dodecane and 160 ml of 1.53M MAO solution in toluene was then slowly added dropwise over a period of 4 hours. After 12 hours at 25° C., the supernatant colorless solution was decanted off and the MAO-laden support was washed with 2×10 ml of toluene. Subsequently, the MAO-laden silica gel was resuspended in 100 ml of iso-dodecane and admixed at 25° C. while stirring with half of a solution of 288 mg of rac-bis[3,3'-(2-methylbenzo[e]indenyl)]dimethylsilanediylzirconium dichloride in 65 ml of 1.53M MAO (toluene solution) over a period of 2 hours. After 0.5 hour, the solvent was removed by means of filtration and the solid was again taken up in 100 ml of iso-dodecane. The remaining amount of the rac-bis[3,3'-(2-methylbenzo[e]indenyl)]dimethylsilanediylzirconium dichloride/MAO solution was then added dropwise over a further period of 2 hours. After addition was complete, the suspension was stirred at 25° C. for a further 0.5 hour and the solid was then filtered off. Washing with 2×20 ml of pentane gave 8.5 g of catalyst.

The polymerization was carried out using a method similar to Example 1.2. In the polymerization of propylene, 213 mg of supported catalyst gave 1120 g of polymer powder, corresponding to a productivity of 5000 g of PP/g of catalyst/h. The associated polymer data are listed in Table 3.

Example 9

5 g of silica gel SG 332 were partially dehydrated at 180° C. under reduced pressure for 8 hours, suspended in 50 ml of pentane and a quarter of 160 ml of 1.53M MAO (toluene solution) was then slowly added dropwise at 25° C. over a period of 1 hour. After 3 hours, the solid was filtered off and resuspended in 50 ml of pentane. The second quarter of the MAO solution used above was then added dropwise (1 hour addition, 3 hours further stirring). After filtering again and resuspending the solid in 50 ml of pentane, the MAO loading was continued with a further 40 ml of MAO solution (1 hour addition, 3 hours further stirring). After filtration and resuspension of the solid in 50 ml of pentane, the last 40 ml of MAO solution were slowly added at 25° C. (1 hour). After 12 hours at 25° C., the supernatant colorless solution was filtered off and the MAO-laden support was washed with 2×10 ml of toluene. Subsequently, the MAO-laden silica gel was resuspended in 100 ml of iso-dodecane and admixed at 25° C. while stirring with half of a solution of 288 mg of rac-bis[3,3'-(2-methylbenzo[e]indenyl)]dimethylsilanediylzirconium dichloride in 65 ml of 1.53M MAO (toluene solution) over a period of 2 hours. After 0.5 hour, all the solvent was removed by means of filtration and the solid was again taken up in 100 ml of iso-dodecane. The remaining part of the rac-bis[3,3'-(2-methylbenzo[e]indenyl)]dimethylsilanediylzirconium dichloride/MAO solution was then added dropwise over a further period of 2 hours. After addition was complete, the suspension was stirred at 25° C. for a further 0.5 hour and the solid was then filtered off. Washing with 2×20 ml of pentane gave 8.9 g of catalyst.

The polymerization was carried out using a method similar to Example 1.2. In the polymerization of propylene 197 mg of supported catalyst gave 1095 g of polymer powder, corresponding to a productivity of 5300 g of PP/g of catalyst/h. The associated polymer data are listed in Table 3.

Example 10

10.1 Preparation of the catalyst 20 g of silica gel SG 332 were partially dehydrated at 180° C. under reduced pressure for 8 hours, suspended in 200 ml of iso-decane and 160 ml of 1.53M MAO (toluene solution) were then slowly added dropwise at 25° C. over a period of 4 hours. After 12 hours at 25° C., the supernatant colorless solution was filtered off and the MAO-laden support was washed with 2×10 ml of toluene and subsequently with 2×50 ml of pentane. Drying at 25° C. in a stream of $N_2$ gave 28.1 g of MAO-deactivated silica gel. A solution of 576 mg of rac-bis-[3,3'-(2-methylbenzo[e]indenyl)]dimethylsilanediylzirconium dichloride in 130 ml of 1.53M MAO/toluene solution was reduced to a volume of 50 ml at 25° C. in a high vacuum. Subsequently, the concentrated MAO/metallocene solution was slowly added dropwise at 25° C. to a suspension of 5.0 g of the MAO-laden silica gel prepared as described above in 250 ml of iso-decane over a period of 4 hours. After 1 hour, the supported catalyst was isolated by filtration, washed with 2×20 ml of pentane and dried at 25° C. in a stream of $N_2$. The yield was 6.4 g.

10.2 Polymerization

The polymerization was carried out using a method similar to Example 1.2. In the polymerization of propylene, 98 mg of supported catalyst gave 850 g of polymer powder, corresponding to a productivity of 8150 g of PP/g of catalyst/h. The associated polymer data are listed in Table 3.

Example 11

11.1 Preparation of the catalyst 20 g of silica gel SG 332 were partially dehydrated at 180° C. under reduced pressure for 8 hours and slowly added to 160 ml of 1.53M MAO (toluene solution) at such a rate that the temperature did not exceed 35° C. Subsequently, 200 ml of n-decane were added dropwise to the silica gel/MAO/toluene suspension over a period of 4 hours and the mixture was stirred at 35° C. for a further 4 hours. The supernatant colorless solution was then filtered off and the MAO-laden support was washed with 2×50 ml of toluene and subsequently with 2×50 ml of pentane. Drying at 25° C. in a stream of $N_2$ gave 27.5 g of MAO-laden silica gel. 5.0 g of the MAO-laden silica gel thus prepared were admixed at 35°c with a solution of 288 mg of rac-bis[3,3'-(2-methylbenzo[e]indenyl)]dimethylsilanediylzirconium dichloride in 65 ml of 1.53M MAO (toluene solution). 200 ml of n-decane were added dropwise over a period of 4 hours and after 1 hour the supported catalyst was isolated by filtration, washed with 2×20 ml of pentane and dried at 25° C. in a stream of $N_2$. The yield was 5.5 g.

11.2 Polymerization

The polymerization was carried out using a method similar to Example 1.2. In the polymerization of propylene, 204 mg of supported catalyst gave 1095 g of polymer powder, corresponding to a productivity of 5100 g of PP/g of catalyst/h. The associated polymer data are listed in Table 3.

Example 12

5.0 g of MAO-laden support material as described in Example 11.1 were suspended at 250C in a solution of 288 mg of rac-bis[3,3'-(2-methylbenzo[e]indenyl)]dimethylsilanediylzirconium dichloride in 65 ml of 1.53M MAO solution in toluene (Witco, toluene solution) and, after addition was complete, admixed dropwise with 100 ml of n-decane. After a further hour at 25° C., the toluene was fractionally distilled off at 35° C. in a high vacuum. The remaining suspension was filtered, the solid was washed with 2×20 ml of pentane and dried in a stream of $N_2$. The yield was 5.8 g.

The polymerization was carried out using a method similar to Example 1.2. In the polymerization of propylene, 395 mg of supported catalyst gave 860 g of polymer powder, corresponding to a productivity of 2050 g of PP/g of catalyst/h. The associated polymer data are listed in Table 3.

Example 13

The procedure of Example 11 was repeated, but a solution of PMAO, 20% strength by weight in toluene (manufactured by Akzo, Deventer, The Netherlands) was used in place of the MAO solution for supporting the catalyst. Correspondingly less 20% strength PMAO/toluene solution was used here in order to use the same molar amounts. The yield of supported catalyst was 5.6 g.

The polymerization was carried out using a method similar to Example 1.2. In the polymerization of propylene, 207 mg of supported catalyst gave 1140 g of polymer powder, corresponding to a productivity of 5250 g of PP/g of catalyst/h. The associated polymer data are listed in Table 3.

Example 14

The procedure of Example 12 was repeated, but the supported catalyst was prepared using 20% strength by weight PMAO (toluene solution). Correspondingly less PMAO/toluene solution was used here in order to use the same molar amounts. The yield was 5.7 g.

The polymerization was carried out using a method similar to Example 1.2. In the polymerization of propylene, 413 mg of supported catalyst gave 920 g of polymer powder, corresponding to a productivity of 2100 g of PP/g of catalyst/h. The associated polymer data are listed in Table 3.

Example 15

The procedure of Example 13 was repeated, but the support material and the supported catalyst were prepared using a 30% strength by weight MAO solution in toluene. Correspondingly less of this MAO/toluene solution was used here in order to use the same amounts of MAO. The yield of supported catalyst was 5.5 g.

The polymerization was carried out using a method similar to Example 1.2. In the polymerization of propylene, 413 mg of supported catalyst gave 920 g of polymer powder, corresponding to a productivity of 2100 g of PP/g of catalyst/h. The associated polymer data are listed in Table 3.

Example 16

The procedure of Example 14 was repeated, but the support material and the supported catalyst were prepared using a 30% strength by weight MAO/toluene solution as in Example 15. Correspondingly less 30% strength by weight MAO/toluene solution was used here in order to use the same amounts of MAO. The yield of supported catalyst was 5.6 g.

The polymerization was carried out using a method similar to Example 1.2. In the polymerization of propylene, 443 mg of supported catalyst gave 920 g of polymer powder, corresponding to a productivity of 1900 g of PP/g of catalyst/h. The associated polymer data are listed in Table 3.

Example 17

17.1 Preparation of the catalyst 20 g of aluminum oxide (ICN Alumina A, Act. I, ICN-Biomedicals, Eschwege) were suspended in 200 ml of n-decane and 160 ml of 1.53M MAO (witco, toluene solution) were then slowly added dropwise at 25° C. over a period of 4 hours. After 12 hours at 25° C., the supernatant colorless solution was filtered off and the MAO-laden support was washed with 2×50 ml of toluene and subsequently with 2×50 ml of pentane. Drying at 25° C. in a stream of $N_2$ gave 28.9 g of MAO-laden aluminum oxide. 5.0 g of the MAO-laden aluminum oxide thus prepared were suspended in a solution of 145 mg of rac-bis[3,3'-(2-methylbenzo[e]indenyl)]dimethylsilanediylzirconium dichloride and 35 ml of 1.53M MAO (toluene solution) and cooled to 0° C. in 5° steps over a period of 4 hours. 250 ml of n-decane was then added dropwise at 0° C. After 1 hour, the supported catalyst was isolated by filtration, washed with 2×20 ml of pentane and dried at 25° C. in a stream of $N_2$. The yield was 5.5 g.

17.2 Polymerization

A dry 10 l autoclave which had been flushed with nitrogen was charged with 50 g of polypropylene powder. Subsequently, 4 l of liquid propylene, 10 ml of triisobutylaluminum (2M in heptane) and 504 mg of catalyst were introduced one after the other into the reactor via a lock. At a stirrer speed of 350 rpm, the autoclave was charge at 25° C. with a further 3 l of propylene. The temperature was subsequently increased stepwise to 65° C., with an internal pressure of 26 bar being established. Polymerization was carried out at 65° C. for 60 minutes and the polymer was discharged in a stream of nitrogen. This gave 910 g of polypropylene, corresponding to a productivity of 1700 g of PP/g of catalyst/h. The associated polymer data are listed in Table 3.

Example 18

The preparation of the support material was carried out using a method similar to Example 6, but the support material was prepared on the basis of aluminum oxide (ICN Alumina A, Act. I) with the iso-dodecane being replaced by n-decane. 5.0 g of the MAO-laden support material thus prepared was suspended at 25° C. in a solution of 145 ml of rac-bis[3,3'-(2-methylbenzo[e]indenyl)]dimethylsilanediylzirconium dichloride and 35 ml of 1.53M MAO (toluene solution). 250 ml of n-decane were added dropwise at 25° C. over a period of 4 hours. After 1 hour, the toluene present was distilled off at 25° C. in a high vacuum. The remaining suspension was filtered, the solid was washed with 2×50 ml of pentane and dried in a stream of $N_2$. The yield was 5.8 g.

The polymerization was carried out using a method similar to Example 17. In the polymerization of propylene, 751 mg of supported catalyst gave 640 g of polymer powder, corresponding to a productivity of 850 g of PP/g of catalyst/h. The associated polymer data are listed in Table 3.

Example 19

19.1 Preparation of the catalyst 250 g of silica gel SG 332 were partially dehydrated at 180° C. under reduced pressure for 8 hours, suspended in 250 ml of iso-dodecane and 2 l of 1.53M MAO (toluene solution) were then slowly added dropwise at 25° C. over a period of 8 hours. After 12 hours at 25° C., the supernatant colorless solution was filtered off and the MAO-laden support was washed with 3×1 l of toluene and subsequently with 2×1 l of iso-dodecane. The MAO-laden silica gel was resuspended in 4.5 l of iso-dodecane and admixed with a solution of 11.69 g of rac-bis[3,3'-(2-methylbenzo[e] indenyl)]dimethylsilanediylzirconium dichloride in 2.63 l of 1.53M MAO (toluene solution) over a period of 8 hours. After 1.5 hours, the supported catalyst was isolated by filtration, washed with 2×1 l of pentane and dried at 25° C. in a stream of $N_2$. The yield was 385 g.

19.2 Polymerization in a continuous 200 l gas-phase reactor

The polymerization was carried out in a vertically mixed gas-phase reactor having a utilizable capacity of 200 l. The reactor contained an agitated fixed bed of finely divided polymer. The reactor output was in all cases 20 kg of polypropylene per hour.

Liquid propylene was decompressed into the gas phase reactor at 60° C. at a pressure of 24 bar. Polymerization was carried out continuously at a mean residence time of 2.5 hours using the catalyst system described. The catalyst was metered in together with the propylene added for regulating the pressure. The amount of catalyst metered in was such that the mean output of 20 kg/h was maintained. Triisobutylaluminum was likewise metered in in an amount of 30 mmol/h as a 1 molar solution in heptane. Polymer was gradually removed from the reactor via an immersed tube by brief depressurization of the reactor. The productivity was calculated from the silicon content of the polymers using the formula below:

P=Si content of the catalyst/Si content of the product

The process parameters and characteristic product properties are shown in Table 4.

Example 20

The preparation of the catalyst was carried out using a method similar to Example 19 and the polymerization was carried out in the continuous 200 l gas-phase reactor using a method similar to Example 19.2, with hydrogen being added as molecular weight regulator. The hydrogen concentration in the reaction gas was 0.08% by volume and was determined by gas chromatography.

The process parameters and characteristic product properties are shown in Table 4.

Example 21

The preparation of the catalyst and the polymerization in the continuous 200 l gas-phase reactor were carried out using a method similar to Example 20. The hydrogen concentration in the reaction gas was 0.115% by volume and was determined by gas chromatography.

The process parameters and characteristic product properties are shown in Table 4.

Example 22

22.1 Preparation of the catalyst 10 g of spray-dried silica gel (particle diameter: 20–45 μm; specific surface area: 325 $m^2/g$; pore volume: 1.50 $cm^3/g$) were dehydrated under reduced pressure at 180° C. for 8 hours, then suspended in 40 ml of toluene and subsequently admixed at 25° C. with 78 ml of 1.53 M methylaluminoxane (toluene solution). After 12 hours, 150 ml of iso-dodecane were slowly added over a period of 4 hours and the mixture was stirred further for 1.5 hours at 25° C. The silica gel which had been deactivated with methylaluminoxane was subsequently filtered off, washed twice with 20 ml each time of toluene and twice with 20 ml each time of pentane and dried in a nitrogen-fluidized bed.

The MAO-laden silica gel was added to a mixture of 525 mg of bis[3,3'-(2-methylbenzo[e]indenyl)] dimethylsilanediylzirconium dichloride and 120 ml of 1.53 M methylaluminoxane solution (in toluene) and stirred at 25° C. After 20 hours, 250 ml of iso-dodecane were slowly added over a period of 4 hours and the mixture was stirred further for 1.5 hours. The solid was subsequently filtered off, washed twice with 20 ml each time of pentane and dried in a nitrogen-fluidized bed. The yield of supported catalyst was 16.8 g.

2.2 Polymerization of propylene

The polymerization was carried out using a method similar to Example 1.2. In the polymerization, 84 mg of supported catalyst gave 1100 g of polymer powder, corresponding to a productivity of 12 500 g of PP/g of catalyst/h.

TABLE 1

Properties of polymers obtained

|  | Example 1 | Example 2 | Example 3 | Example 4 | Example 5 |
|---|---|---|---|---|---|
| Bulk density [g/l] | 427 | 438 | 418 | 385 | 390 |
| Flowability R 20 [g/sec] | 40.5 | 40.5 | 41.5 | 42.0 | 42.5 |
| Sieve analysis: |  |  |  |  |  |
| <0.1 mm [%] | 0.0 | 0.1 | 0.2 | 0.0 | 0.0 |
| 0.1 mm–0.5 mm [%] | 0.2 | 0.8 | 1.5 | 0.4 | 0.5 |
| 0.25 mm–0.5 mm [%] | 7.0 | 11.6 | 4.3 | 1.4 | 1.8 |
| 0.5 mm–1.0 mm [%] | 72.5 | 68.5 | 30.1 | 14.7 | 8.7 |
| 1.0 mm–2.0 mm [%] | 20.0 | 18.2 | 62.9 | 83.0 | 88.1 |
| >2.0 mm [%] | 0.3 | 0.8 | 1.0 | 0.5 | 0.9 |

TABLE 2

Results of the polymerization experiments

|  | Example 1 | Example 2 | Example 3 | Example 4 | Example 5 |
|---|---|---|---|---|---|
| Productivity [g of polymer/g of catalyst/h] | 1 500 | 2 450 | 3 700 | 4 950 | 5 950 |
| Activity [g of polymer/mmol of Zr/h] | 214 286 | 180 147 | 151 639 | 137 119 | 123 444 |
| Zr content [μmol of Zr/g of catalyst] | 7.0 | 13.6 | 24.4 | 36.1 | 48.2 |
| Al content [% by weight] | 14.3 | 14.8 | 14.9 | 15.0 | 16.8 |
| [Al]/[Zr] ratio | 757 | 403 | 226 | 154 | 129 |
| XS [% by weight]* | 0.6 | 0.3 | 0.3 | 0.4 | 0.6 |

TABLE 2-continued

Results of the polymerization experiments

|  | Example 1 | Example 2 | Example 3 | Example 4 | Example 5 |
|---|---|---|---|---|---|
| MFI [g/10 min]** | 4.4 | 5.7 | 4.6 | 4.7 | 4.0 |
| Viscosity η[dl/g] | 2.28 | 2.09 | 2.17 | 2.17 | 2.67 |
| Melting point (DSC) [° C.] | 146.7 | 143.6 | 146.3 | 146.3 | 145.4 |
| $M_w$ [g/mol] | 295 027 | 246 368 | 276 562 | 288 197 | 331 045 |
| $M_w/M_n$ | 2.0 | 1.8 | 1.7 | 1.9 | 1.9 |

*XS = xylene-soluble proportion in accordance with ISO 1873-1: 1991 (E)
**MFI = Melt Flow Index in accordance with DIN ISO 1133, Method B at 230° C./2.16 kg

TABLE 3

Results of the polymerization experiments

|  | Example 6 | Example 7 | Example 8 | Example 9 | Example 10 |
|---|---|---|---|---|---|
| Productivity [g of polymer/g of catalyst/h] | 5 050 | 5 700 | 5 000 | 5 300 | 8 150 |
| XS [% by weight] | 0.3 | 0.6 | 0.4 | 0.5 | 0.3 |
| MFI [g/10 min] | 5.6 | 5.8 | 5.9 | 3.7 | 7.2 |
| Viscosity η[dl/g] | 2.15 | 2.14 | 2.01 | 2.12 | 2.14 |

|  | Example 11 | Example 12 | Example 13 | Example 14 | Example 15 |
|---|---|---|---|---|---|
| Productivity [g of polymer/g of catalyst/h] | 5 100 | 2 050 | 5 200 | 2 100 | 4 550 |
| XS [% by weight] | 0.5 | 0.3 | 0.4 | 0.6 | 0.1 |
| MFI [g/10 min] | 6.1 | 4.3 | 5.8 | 8.93 | 7.17 |
| Viscosity η[dl/g] | 2.13 | 2.18 | 2.10 | 1.93 | 2.02 |

|  | Example 16 | Example 17 | Example 18 | Example 22 |
|---|---|---|---|---|
| Productivity [g of polymer/g of catalyst/h] | 1 900 | 1 700 | 850 | 12 500 |
| XS [% by weight] | 0.8 | 0.6 | 0.6 | 0.4 |
| MFI [g/10 min] | 3.6 | 5.3 | 5.3 | 2.9 |
| Viscosity η[dl/g] | 2.29 | 2.12 | 2.12 | 2.37 |

TABLE 4

Influence of hydrogen on the polymerization

|  | Example 19 | Example 20 | Example 21 |
|---|---|---|---|
| p/T [bar/° C.] | 24/60 | 24/60 | 24/60 |
| TIBA* [mmol/h] | 30 | 30 | 30 |
| $H_2$ [% by volume] | 0 | 0.08 | 0.115 |
| MFI [g/10'] | 4.8 | 9.1 | 21.6 |
| DSC [° C.] | 146.2 | 145.9 | 146.3 |
| eta [gl/g] | 2.15 | 1.81 | 1.58 |
| XS [%] | 0.4 | 0.5 | 0.5 |
| Si [ppm] | 45.6 | 30.2 | 29.2 |
| P [g of PP/g of cat] | 5700 | 8600 | 8900 |
| R20* [g/sec] | 41.7 | 45.5 | 40 |
| Bulk density [g/l] | 353 | 405 | 375 |
| d'[mm] | 1.34 | 1.35 | 1.38 |
| <0.125 mm [%] | 0.01 | 0.04 | 0.04 |
| <0.25 mm [%] | 0.3 | 0.57 | 0.6 |
| <0.50 mm [%] | 2.22 | 4.02 | 4.73 |
| <1.0 mm [%] | 35.78 | 34.16 | 31.17 |
| <2.0 mm [%] | 61.2 | 58.53 | 59.75 |
| >2.0 mm [%] | 0.49 | 2.68 | 3.71 |

*TIBA = Triisobutylaluminum
*R20 = Flowability in accordance with DIN 53492 (1992), ISO 6186 (1980)

We claim:

1. A process for preparing supported transition metal catalyst comprising a particulate organic or inorganic support material, a transition metal complex and a compound capable of forming metallocenium ions, which comprises the following process steps:

a) contacting a solution of a compound capable of forming metallocenium ions with a second solvent in which this compound is only sparingly soluble, in the presence of the support material, b) removing at least part of the solvent from the support material and c) contacting a solution of a mixture of a compound capable of forming metallocenium ions and a transition metal complex of the general formula III

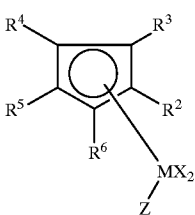

III where the substituents have the following meanings:

M is titanium, zirconium, hafnium, vanadium, niobium or tantalum,

X is fluorine, chlorine, bromine, iodine, hydrogen, $C_1$–$C_{10}$-alkyl, $C_6$–$C_{15}$-aryl, alkylaryl having from 1 to 10 carbon atoms in the alkyl radical and from 6 to 20 carbon atoms in the aryl radical, —$OR^7$ or —$NR^7R^8$, where $R^7$ and $R^8$ are $C_1$–$C_{10}$-alkyl, $C_6$–$C_{15}$-aryl, alkylaryl, arylalkyl, fluoroalkyl or fluoroaryl each having from 1 to 10 carbon atoms in the alkyl radical and from 6 to 20 carbon atoms in the aryl radical, $R^2$ to $R^6$ are hydrogen, $C_1$–$C_{10}$-alkyl, 5- to 7-membered cycloalkyl which may in turn bear a $C_1$–$C_{10}$-alkyl group as substituent, $C_6$–$C_{15}$-aryl or arylalkyl, where two adjacent radicals may also together form a saturated or unsaturated cyclic group having from 4 to 15 carbon atoms, or $Si(R^9)_3$ where $R^9$ is $C_1$–$C_{10}$-alkyl, $C_3$–$C_{10}$-cycloalkyl, or $C_6$–$C_{15}$-aryl, Z is 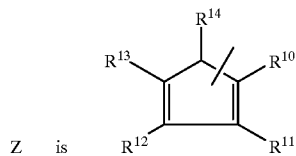

where the radicals $R^{10}$ to $R^{14}$ are hydrogen, $C_1$–$C_{10}$-alkyl, 5- to 7-membered cycloalkyl which may in turn bear a $C_1$–$C_{10}$-alkyl group as substituent, $C_6$–$C_{15}$-aryl or arylalkyl and where two adjacent radicals may also together form a saturated or unsaturated cyclic group having from 4 to 15 carbon atoms, or $Si(R^{15})_3$ where $R^{15}$ is $C_1$–$C_{10}$-alkyl, $C_6$–$C_{15}$-aryl or $C_3$–$C_{10}$-cycloalkyl, or where the radicals $R^5$ and $R^{13}$ together form a group —$R^{16}$—, where $R^{16}$ is 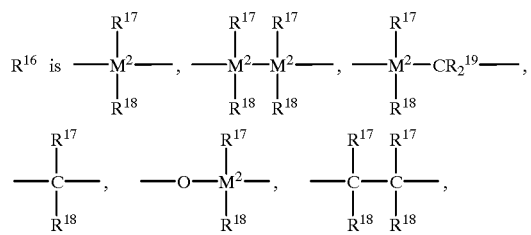

=$BR^{17}$, =$AlR^{17}$, —Ge—, —Sn—, —O—, —S—, =SO, =$SO_2$ =$NR^{17}$, =CO, =$PR^{17}$ or =$P(O)R^{17}$, where $R^{17}$, $R^{18}$, and $R^{19}$ are identical or different and are hydrogen, halogen, $C_1$–$C_{10}$-alkyl, $C_6$–$C_{10}$-alkyl, $C_1$–$C_{10}$-fluoroalkyl, $C_6$–$C_{10}$-fluoroaryl, $C_6$–$C_{10}$-aryl, $C_1$–$C_{10}$-alkoxy, $C_2$–$C_{10}$-alkenyl, $C_7$–$C_{40}$-arylalkyl, $C_8$–$C_{40}$-arylalkenyl or $C_7$–$C_{40}$-alkylaryl or two adjacent radicals together with the atoms connecting them from a ring, and $M^2$ is silicon, germanium or tin, with a second solvent in which this mixture is only sparingly soluble, in the presence of the support material obtained as described in a) and b).

2. A process as claimed in claim 1, wherein the compound capable of forming metallocenium ions which is used comprises open-chain or cyclic aluminoxane compounds of the general formula I or II

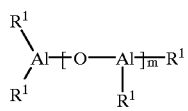 I

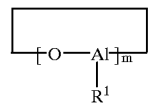 II where $R^1$ is $C_1$–$C_4$-alkyl and m is an integer from 5 to 30.

3. A process as claimed in claim 1, wherein the transition metal complexes used are ones having benzindenyl ligands.

4. A process as claimed in claim 1, wherein the transition metal complexes contain two aromatic ring systems bridged to one another as ligands.

5. A process as claimed in claim 1, wherein, in process step b), at least part of the solvent is removed by filtration of the support material.

6. A process as claimed in claim 1, wherein, in process step b), at least part of the solvent is removed by distillation.

7. A process as claimed in claim 1, wherein the support material is, before the process step c), washed with a solvent in which the compound capable of forming metallocenium ions is readily soluble.

8. A supported catalyst obtained by a process claimed in claim 1.

9. A process for preparing polymers of $C_2$–$C_{12}$-alk-1-enes at from −50 to 300° C. and pressures of from 0.5 to 3000 bar in the presence of a catalyst as claimed in claim 8.

* * * * *